United States Patent Office 2,972,603
Patented Feb. 21, 1961

2,972,603
PYRIDINE-RING CONTAINING RESINS AND PROCESS OF PREPARING THEM

Francis E. Cislak, Indianapolis, Ind., assignor to Reilly Tar & Chemical Corporation, Indianapolis, Ind., a corporation of Indiana No Drawing. Filed Feb. 17, 1958, Ser. No. 715,532

10 Claims. (Cl. 260—79)

This invention relates to synthetic polymers containing a pyridine ring in their molecular make-up and to the process of making them. More particularly, it relates to polymers prepared by the interaction of polyalkylpyridines with sulfur and a polyamine.

In U.S. Patent 2,402,020 there are described various elastomers containing pyridine rings in their molecular structures. The elastomers described therein are prepared by the copolymerization of vinylpyridine with various monomers, such as butadiene, styrene, acrylonitrile, and the like. In my co-pending application Serial No. 454,609, filed September 7, 1954, I describe and claim pyrdiine-ring containing co-polymers of polyalkylpyridines and a conjugated diene.

I now find that I can prepare resinous compositions containing a pyridine nucleus by reacting a polyalkylpyridine, such for example, as 2,6-lutidine, with sulfur and polyamine, as for example p-phenylenediamine.

The polyalkylpyridines which are particularly useful for practicing my invention are 2,6-lutidine, 2,4,6-collidine, 2,3,6-collidine, 2,4-lutidine, 2-methyl-4-ethylpyridine, 2,6-diethylpyridine, and the like. All these polyalkylpyridines are characterized by the presence of a —CH$_2$— group in the 2-position and in either or both the 4-position, and the 6-position.

The polyamines which are particularly useful for the synthesis of my new co-polymers are the o-, m-, and p-phenylenediamines, 2,4-diaminotoluene, benzidine, 4,4'-diaminodiphenylmethane, 4,4'-diaminotriphenylmethane, 4,4',4''-tri-aminotriphenylmethane, 1,2 - bis - p - aminophenylethane, 1,5-diaminonaphthalene, 1,6-diaminonaphthalene, and the like. All of these polyamines are characterized by the amino-group being attached to an aromatic hydrocarbon nucleus.

My resins include a pyridine ring, an aromatic hydrocarbon ring, and a sulfur atom as components of the resin matrix. The presence of these groups makes my resins useful in controlling the action of non-oxidizing inorganic acids on metals. A solution of my resins in high-boiling coal-tar bases makes a particularly useful inhibitor for the pickling of steel with aqueous sulfuric acid.

It is, of course, quite difficult to be absolutely certain of the molecular configuration of any resin. I believe, however, that my resins have recurring in their matrix the grouping:

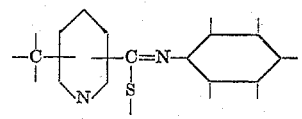

The presence of HS— groups in my resins makes them useful in connection with "graft polymerization." Elastomers are softened by cold milling. The shearing forces applied during the cold milling cause a scission of the polymer molecules. The ruptured chains are free radicals capable of undergoing, among other reactions, a grafting on to other polymer molecules. If an elastomer of the GR–S type and my resins are cold-milled together, the polymeric free radicals graft onto the HS-group of my resins and so are cross terminated or grafted onto my resins. The resulting elastomer has improved resistance to oils as compared to GR–S rubber.

My resins may be useful as chelating agents for copper, nickel, zinc, mercury ions.

Illustrative of the manner in which my invention may be practiced are the following examples.

Example 1

A mixture of about one mole of 2,6-lutidine, one mole of benzidine, about eight moles of sulfur, and about two moles of 3-picoline are heated under reflux at about 140-160° C. for from about six hours to about 16 hours. Hydrogen sulfide is evolved during the heating period. An interaction between the 2,6-lutidine, the p-phenylenediamine, and the sulfur occurs to form a resinous composition. The reaction may be considered complete when the evolution of hydrogen sulfide has substantially ceased. The resin formed may be recovered from the reaction mixture in any convenient way. The simplest way of recovering the resin is to remove the 3-picoline, which served as a diluent during the reaction period, by distillation under vacuum and then pour the hot resin into shallow pans for cooling. Or the reaction mixture may be dissolved in dilute hydrochloric acid, any insoluble matter being removed by filtration; the hydrochloric acid solution is then made alkaline with ammonia, thereby precipitating the resin, the precipitated resin is separated from the liquor, washed with water, and dried.

The so-formed resin has a dark reddish brown color, is insoluble in petroleum type solvents, but is soluble in pyridine bases such as pyridine, the picolines, and the lutidines.

I believe the resin formed from 2,6-lutidine, sulfur, and benzidine has the molecular structure:

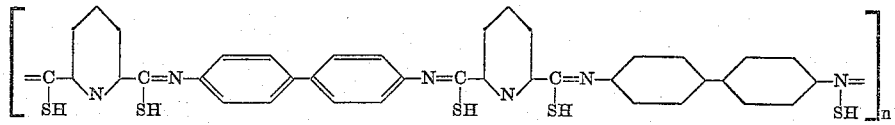

I may replace some of the benzidine in my reaction mixture by 4,4'-dinitrodiphenyl. The hydrogen sulfide formed during the reaction period reduces the dinitrodiphenyl to benzidine, which latter compound then reacts with the sulfur and 2,6-lutidine to form the resinous products.

Example 2

The process of Example 1 is repeated with the exception that p-phenylenediamine is used in place of the benzidine.

The exact molecular make-up of my new resin is not known. I believe, however, that the resin formed from 2,6-lutidine, sulfur, and p-phenylenediamine may be represented as having the structure:

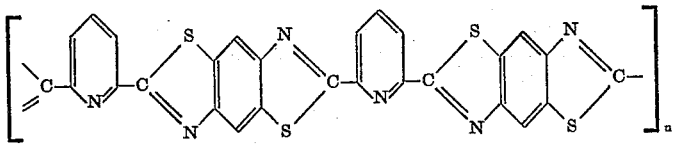

In place of the p-phenylenediamine, I may use p-nitroaniline. This latter compound is reduced by the hydrogen sulfide formed during the reaction and is thereby converted to p-phenylenediamine.

Example 3

The procedure of Example 1 is followed with the exception that in place of the 2,6-lutidine, I use one mole of 2,4-lutidine.

Example 4

The procedure of Example 1 is followed with the exception that in place of the 2,6-lutidine, I use about two-thirds of a mole of 2,4,6-collidine.

The resin so formed is characterized by its relatively high softening point. I believe this important property is due to the cross-linking which occurs because of the presence of three active groups on the collidine. The molecular structure of this new resin may be portrayed as:

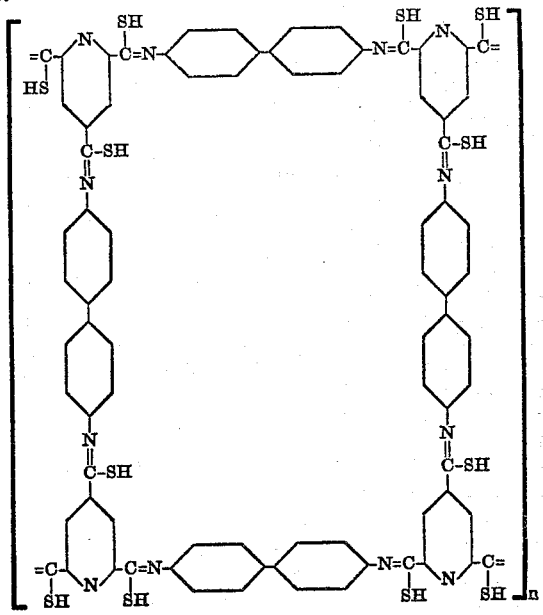

I may replace some of the 2,4,6-collidine by, say 2,6-lutidine, thereby limiting the amount of cross-linkage and thus obtain a more flexible resin.

Example 5

The process of Example 1 is repeated with the exception that in place of the p-phenylenediamine, I use one mole of 4,4'-diaminodiphenylmethane.

In general, I prefer to react an individual polyalkylpyridine with sulfur and an individual polyamine. However, if I so desire, I may react a mixture of polyalkylpyridines with sulfur and an individual polyamine. Or I may react an individual polyalkylpyridine with sulfur and a mixture of polyamines. Or I may react a mixture of polyalkylpyridines with sulfur and a mixture of polyamines.

I claim as my invention:

1. The process of preparing a resinous composition which comprises heating a mixture of about 8 mole parts of sulfur, about one mole part of a polyalkylpyridine selected from the group consisting of 2,6-lutidine, 2,4,6-collidine, 2,3,6-collidine, 2,4-lutidine, 2-methyl-4-ethylpyridine, and 2,6-diethylpyridine, and about one mole part of a polyamine in which the amino groups are attached to an aromatic hydrocarbon nucleus.

2. The process of claim 1 in which the polyalkylpyridine is 2,6-lutidine and the polyamine is benzidine.

3. The process of claim 1 in which the polyalkylpyridine is 2,4,6-collidine and the polyamine is benzidine.

4. The process of claim 1 in which the polyalkylpyridine is 2,6-lutidine and the polyamine is p-phenylenediamine.

5. The process of claim 1 in which the polyalkylpyridine is 2,6-lutidine and the polyamine is 4,4'-diaminodiphenylmethane.

6. The resinous product obtained by the process of claim 1.

7. The resinous product obtained by the process of claim 2.

8. The resinous product obtained by the process of claim 3.

9. The resinous product obtained by the process of claim 4.

10. The resinous product obtained by the process of claim 5.

References Cited in the file of this patent

UNITED STATES PATENTS

| | | |
|---|---|---|
| 1,761,291 | Bly | June 6, 1930 |
| 1,949,956 | Derby | Mar. 6, 1934 |